Dec. 6, 1966   W. M. DAY   3,290,484
COFFEE MAKER-SERVER
Filed March 22, 1963
FIG. 1
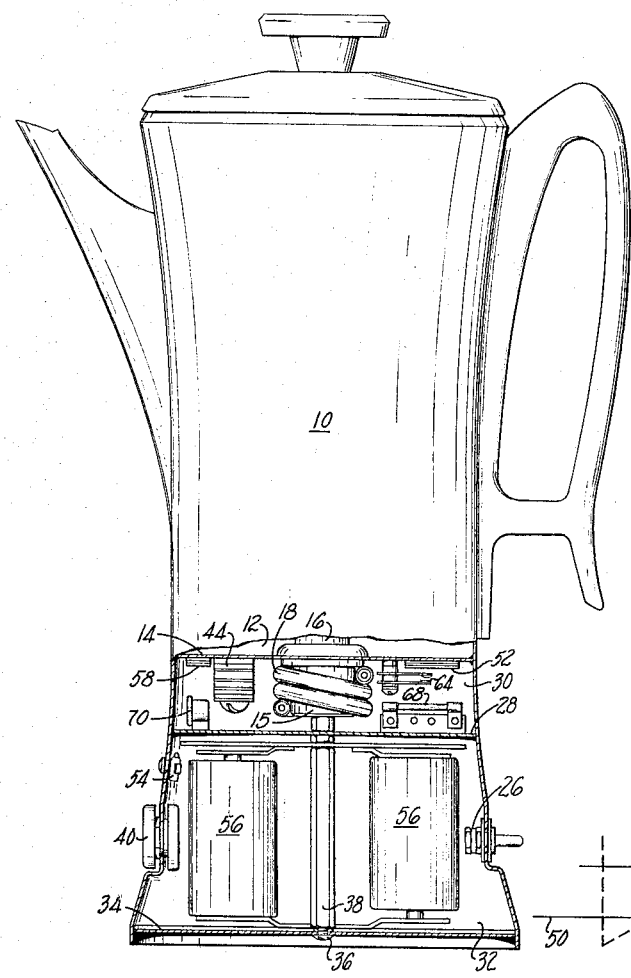
FIG. 2
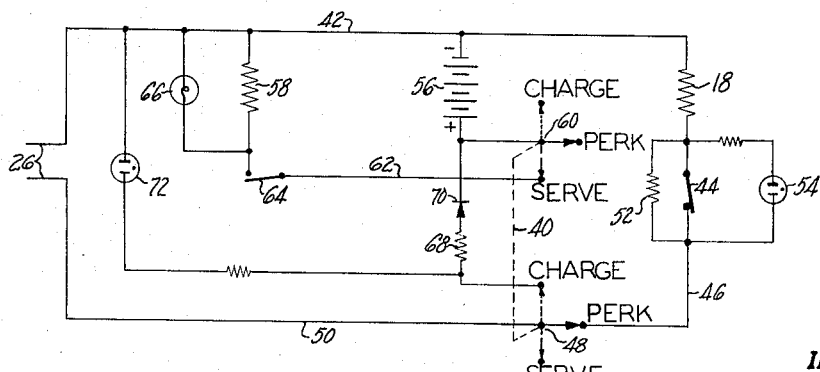
FIG. 3
INVENTOR.
WILLIAM M. DAY
BY  Darby & Darby
ATTORNEYS

United States Patent Office 3,290,484
Patented Dec. 6, 1966

3,290,484
COFFEE MAKER-SERVER
William M. Day, Hudson, Ohio, assignor, by mesne assignments, to General Electric Company, Bridgeport, Conn., a corporation of New York
Filed Mar. 22, 1963, Ser. No. 267,100
6 Claims. (Cl. 219—441)

This invention relates to improvements in coffee makers and more particularly to an electric powered percolator which is suitable for use as a cordless heating coffee server.

It is a principal object of this invention to provide an electric powered percolator which incorporates an auxiliary self-contained power source which may be selectively connected so as to heat the coffee when the percolator is used as a server.

It is another object of this invention to provide a coffee maker-server having rechargable batteries and including electric circuit means for recharging the batteries from a conventional 110 v. A.C. power source.

A still further object of this invention is to provide a combination coffee percolator-server having rechargable batteries and including electric circuit means constructed and arranged for recharging the batteries during the percolating cycle.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side elevational view, partly broken away, of an exemplary coffee maker of the percolator type which incorporates this invention;

FIG. 2 is a schematic diagram showing the electrical circuit connections utilized in the coffee maker of this invention; and FIG. 3 is a fragmentary schematic diagram of a modified form of this invention.

Referring to the drawing, in which like numerals are used to indicate like parts, the illustrated coffee maker 10 may be of any suitable type and provides a compartment 12 for containing the liquid coffee brew. The compartment is provided with a bottom wall 14 which supports a pump 15 at the lower end of a fountain tube 16. An electric resistance heater 18 of any suitable type, and shown as being a sheathed heater type, is provided to heat the water so as to cause it to rise in the fountain tube. The ends (not shown) of the pump heater 18 are connected to a pair of terminals 26 which may be connected with the ordinary residence outlet plug by a cord set (not shown).

As shown in FIG. 1, an intermediate transverse wall 28 is provided to form an intermediate compartment 30 located between the coffee container receptacle and a third compartment 32 positioned in the lower end of the percolator body. The bottom of the lower compartment 32 is closed as by a removable circular metal plate 34 which may be held in position by a screw 36 threadedly engaged in apertured central post 38 of the percolator. A self-contained power supply 56, such as a pair of batteries which are preferably of the rechargeable flashlight type, are mounted in the lower compartment 32 of the percolator 10 and are electrically connected in series circuit relationship with each other. It will be readily apparent that the intermediate compartment 30 may be sealed to facilitate the washability of the coffee maker 10.

Turning now particularly to FIG. 2, in which the solid lines show the circuit connection as they appear at the beginning of the percolator cycle, it will be readily apparent that when the terminals 26 are connected to an external source of power, the electric circuit will be completed through the pump heater 18 by conductor 42, normally closed thermostat 44, conductor 46, switch 48 and conductor 50 to cause the same to heat the liquid to form a coffee brew in the usual manner. When the brew has been heated to the preset temperature, the normally closed thermostat 44, which is preferably of the bimetal type, opens due to the heat conducted thereto from the coffee brew through wall 14 on which it is mounted, to place warming resistor 52 in series with the pump heater 18. While only one warming resistor 52 is shown, it will be readily apparent that a plurality of such resistors, mounted on wall 14 to uniformly heat the brew, may be provided. Since the resistance of warming resistors 52 is substantially greater than that of pump heater 18 and the resistors are in heat transfer relationship with wall 14 of compartment 12, it is apparent that they will provide a low level of heat to keep the coffee hot so long as the terminals 26 are connected to an external source of power and switch 48 is in the position shown in solid lines in FIG. 2.

A neon or signal light 54, which is connected in parallel circuit relationship with the warming heater 52 becomes illuminated to indicate that the coffee is prepared and ready to be served.

It is frequently inconvenient to connect the terminals 26 to an external source of power to keep the coffee hot as it is being served. In accordance with one aspect of this invention, an arrangement is provided for overcoming this problem.

Referring to FIGS. 1 and 2, there is provided a self-contained power supply 56 which may be connected to one or more battery-powered warming heaters 58 mounted on the bottom wall 14 of the coffee receptacle. In order to connect the warming heaters 58 to the self-contained power source 56, there is provided a switch 60 which, when switched to the "Serve" position as shown in dashed lines in FIG. 2, closes the circuit between the warming heaters 58 and the self-contained power source 56 through the conductors 42 and 62 so that the warming heaters are energized to provide heat to warm the coffee, and the coffee maker may thus be used as a cordless heating coffee server.

Preferably, and as shown in the drawings, switches 48 and 60 are combined to form a two-pole, three-position switch 40.

A normally open thermal-responsive switch 64 is included in the circuit for warming heaters 58. It will be apparent that switch 64 will be heated during the percolation of the coffee so as to cause its contact points to close to prepare the circuit for the warming heaters 58 which are subsequently connected to the self-contained power source 56 by switch 60 when it is desired to use the coffee maker as a cordless coffee server. It will also be readily apparent that when the coffee maker 10 is not in use, thermal switch 64 will assume its normally open position to prevent the discharge of the self-contained power supply 56.

If desired, and as shown in FIG. 2, an indicator light 66 may be connected across the battery-operated warming heaters 58 to serve as a visual indicator that these heaters are being energized.

In order to recharge the batteries, it is merely necessary to move the switch 48 to its "Charge" position to complete the circuit between the external power source and the batteries 56. Specifically, the external power source is connected by conductor 50, switch 48 (as shown in dotted lines), a dropping resistor 68, which is provided to limit the charging rate of the batteries 56 to the desired level, and a rectifier 70 to provide the required unidirectional charging current for the batteries. It will also be noted that when the switch is placed in this third position, the pump heater 18 is disconnected from the external power source by switch 48 and the battery warming heaters 58 are disconnected from the batteries 56 by switch 60.

If desired, and as illustrated in FIG. 2, a neon signal light 72 may be provided to provide a visual indication that the charging circuit is being energized.

In the modification of FIG. 3, electric circuit means may be provided so that the batteries can be recharged during the percolation cycle. As shown, such means is provided by connecting the "Perk" terminal of the switch 48 to the "Charge" terminal thereof by a conductor 73. It is desirable that this connection include a switch 74 which may be closed so that the batteries may be recharged without applying a voltage across the heater 18. Thus, the modification of FIG. 3 provides additional flexibility in the use of the coffee maker-server of this invention since the batteries 56 can be recharged during the percolation cycle if desired. Also, the coffee maker can be used without recharging the batteries during the percolation cycle which would be desirable under certain conditions as, for example, if the batteries were in a full state of charge.

In operation, assuming a new brew of coffee is to be made, water is placed in the compartment 12, the control switch 40 is placed in the "Perk" position, and the terminals 26 are connected to an external source of power. As the coffee is heated, the normally open thermal-responsive switch 64 is closed due to the heat of the brew to prepare the circuit of battery-operated warming heaters 58 for energization by the batteries 56. When the brewing is completed, the bimetal control thermostat 44 opens to place the external power operated warming heaters 52 in series with the pump heater so that the coffee is kept warm until it is used.

If it is desired to disconnect the coffee maker from the electrical power and yet keep the coffee hot, the control switch 40 is then turned to its "Serve" position which closes the circuit between the auxiliary self-contained power supply 56 and the warming heaters 58 to provide a cordless heating coffee server. As required, the control switch 40 may be placed in the "Charge" position and the terminals 26 connected to an external power source to recharge the batteries for subsequent use. If the modification of FIG. 3 is included, such recharging may also take place during a subsequent percolation cycle by closing switch 74 at that time.

It will be apparent that this invention provides an electric percolator which is also useful as a cordless heating coffee server. It will also be apparent that this invention includes means to prevent the discharge of the batteries 56 during storage regardless of the setting of switch 40 since the normally open thermal switch 64 will interrupt the circuit to the warming heaters 58 and the rectifier 70 will block the flow of current from the batteries 56 through the pump heater 18.

While the foregoing describes the invention in what is presently believed to be its preferred embodiments, it should be understood that modifications thereof will occur to those skilled in the art. Accordingly, it will be understood that the invention is not limited to the precise details illustrated and described and that the appended claims are intended to cover all devices falling within the spirit and scope thereof.

I claim:

1. A combination coffee maker-server comprising a compartment for containing a liquid for making a coffee brew, a thermal pump for circulating the liquid in said compartment, a main electric heater in heat exchange relation with said pump to actuate said pump, cause percolation of the liquid and heat the liquid to a desired temperature, an auxiliary electric heater for maintaining the liquid in said compartment warm, a self-contained auxiliary power supply carried by said coffee maker-server, a first electric circuit means for connecting said main electric heater to an external power source including a temperature sensitive switch to terminate percolation when the liquid reaches the desired temperature, a second electric circuit means for connecting said auxiliary electric heater to said auxiliary power supply, said second circuit means being independent from said first circuit means, and a common control switch having at least two operative positions including a first position for connecting said main heater to an external power supply source and disconnecting said auxiliary heater from said auxiliary power supply and a second position for disconnecting said main heater from the external power source and connecting said auxiliary heater to said auxiliary power supply.

2. A combination coffee maker-server comprising a compartment for containing a liquid for making a coffee brew, a thermal pump for circulating the liquid in said compartment, a main electric heater in heat exchange relation with said pump for heating the liquid to thereby actuate the pump, electric circuit means for connecting said electric heater to an external power source, an electric heater for heating the compartment, a self-contained auxiliary power supply carried by said coffee maker-server, circuit means including a common control switch having at least two operative positions including a first position for connecting said main heater to the external power source and disconnecting said auxiliary heater from said auxiliary power supply and a second position for disconnecting said main heater from the external power source and connecting said auxiliary heater to said auxiliary power supply, and a temperature-responsive switch in heat exchange relation with said compartment connected to open the circuit between said auxiliary power supply and said auxiliary heater to prevent the discharge of said auxiliary power supply when said coffee maker-server is in storage regardless of the setting of said control switch.

3. A combination coffee maker-server comprising a compartment for containing a liquid for making a coffee brew, a thermal pump for circulating the liquid in said compartment, a main electric heater in heat exchange relation with said pump for heating the liquid, electric circuit means for connecting said electric heater to an external power source, an auxiliary electric heater for heating the compartment, a self-contained auxiliary power supply carried by said coffee maker-server, circuit means including a common control switch for selectively disconnecting the external power source from said electric heater and for connecting the auxiliary power supply to the auxiliary heater to supply heat to the compartment thereby to keep its contents hot, and a normally open bimetal switch in heat exchange relation with said compartment connected in series circuit relation with said auxiliary power supply and said auxiliary heater to prevent current flow therebetween regardless of the setting of said control switch when said compartment is at normal room temperature.

4. In a coffee maker a casing including a coffee brewing compartment, an electric heater positioned in said casing for heating the liquid to obtain a coffee brew, a temperature responsive control thermostat connected in series with said electric heater and adapted to be opened when the coffee brew reaches a predetermined temperature, a first electric warming heater connected in parallel with said thermostat for maintaining the coffee brew warm while said electric heater and first warming heater are connected to an external source of power, a second electric warming heater for maintaining the coffee brew warm while said electric heater and first warming heater are disconnected from the external source of power, a self-contained auxiliary power supply carried by said casing, and circuit means including a common control switch having at least two operative positions including a first position for connecting said electric heater to the external power source and disconnecting said second warming heater from said auxiliary power supply and a second position for disconnecting said electric heater from the external power source and connecting said second warming heater to said auxiliary power supply whereby the coffee maker may be used as a cordless heating coffee server.

5. In a coffee maker-server the combination comprising a receptacle having a first compartment for containing a liquid for making a coffee brew, a plurality of separably operable electric heater elements for heating the coffee brew, walls forming a second compartment immediately below the first compartment for containing said elements, electrical connecting means for each of said heater elements, battery means, a third compartment positioned in the base of said receptacle and having a removable cover forming the bottom thereof, said third compartment being constructed and arranged to receive said battery means, electric circuit control means for selectively connecting said battery means to said electrical connecting means of one of said heater elements, power supply means for connecting said electrical connecting means of the other of said heater elements to an external power source, the electrical connecting means of said one of said heater elements including a normally open temperature sensitive switch to prevent current flow to said heater element regardless of the condition of the circuit control means when the first compartment is at normal room temperature, and the electrical connecting means of the other of said heater elements including at least one normally closed temperature sensitive switch.

6. A combination coffee maker-server comprising a compartment for containing a liquid for making the coffee brew, a pump including an electric heater and current supply circuit for heating the liquid, and auxiliary electric heater for heating the compartment, a rechargeable self-contained auxiliary power supply carried by said coffee brew server, means including a first control switch for connecting the auxiliary power supply to the auxiliary heater, means including a second control switch and rectifier for recharging said auxiliary power supply from an external power source, and a normally opened bimetal switch in heat exchange relation with said compartment connected in series circuit relation with said auxiliary power supply and said auxiliary heater whereby the discharge of the auxiliary power supply in storage is prevented regardless of the setting of said first control switch.

References Cited by the Examiner

UNITED STATES PATENTS

| | | | |
|---|---|---|---|
| 1,727,959 | 9/1929 | Bowen | 219—208 |
| 1,794,891 | 3/1931 | Gerhardt | 219—205 |
| 2,205,884 | 6/1940 | Greenman | 219—386 X |
| 2,277,605 | 3/1942 | Palitzsch | 219—439 |
| 2,610,284 | 9/1952 | Kolisch | 219—441 |
| 2,817,744 | 12/1957 | Free | 219—439 |
| 3,079,486 | 2/1963 | Winchell | 219—528 |
| 3,105,138 | 9/1963 | Gazdik | 219—433 X |
| 3,247,360 | 4/1966 | Ponder | 219—439 X |

FOREIGN PATENTS 344,639  3/1960  Switzerland.

ANTHONY BARTIS, *Primary Examiner.*